United States Patent
Rajagopal et al.

(10) Patent No.: US 10,846,149 B1
(45) Date of Patent: Nov. 24, 2020

(54) EVENT CONTEXT SERVICE

(71) Applicant: Amazon Technologies, Inc., Seattle, WA (US)

(72) Inventors: Ravishankar Rajagopal, Seattle, WA (US); Carl Wesley Summers, Bainbridge Island, WA (US); Adam Winstanley, Redmond, WA (US); Ayush Goyal, Seattle, WA (US); Arvinth Ravi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 629 days.

(21) Appl. No.: 15/592,024

(22) Filed: May 10, 2017

(51) Int. Cl.
*G06F 9/54* (2006.01)
*G06F 16/21* (2019.01)

(52) U.S. Cl.
CPC ............ *G06F 9/542* (2013.01); *G06F 16/219* (2019.01); *G06F 2201/84* (2013.01)

(58) Field of Classification Search
CPC .... G06F 16/219; G06F 2201/84; G06F 9/542; G06F 11/1446
See application file for complete search history.

(56) References Cited

U.S. PATENT DOCUMENTS

| | | | | |
|---|---|---|---|---|
| 2011/0173239 A1* | 7/2011 | Sayed | ..................... | G06F 9/542 707/821 |
| 2012/0159324 A1* | 6/2012 | Chavez | .................. | G06Q 50/24 715/704 |
| 2012/0180057 A1* | 7/2012 | Levine | ................. | G06F 11/3476 718/102 |
| 2014/0157288 A1* | 6/2014 | Wong | .................. | G06F 11/3476 719/318 |
| 2015/0161031 A1* | 6/2015 | Chea | .................... | G06F 11/3664 717/125 |
| 2017/0116210 A1* | 4/2017 | Park | ..................... | G06F 11/1471 |
| 2018/0143881 A1* | 5/2018 | Singer | ................. | G06F 11/1658 |

OTHER PUBLICATIONS

"Amazon CloudWatch," Amazon Web Services, Inc., © 2017, <https://aws.amazon.com/cloudwatch/> [retrieved May 2, 2017], 7 pages.

\* cited by examiner

*Primary Examiner* — Brian W Wathen
(74) *Attorney, Agent, or Firm* — Davis Wright Tremaine LLP

(57) ABSTRACT

A context management service provides historical context information describing the state of a computer system at a particular time to an event processing service. When an event is received by the event processing service, the event processing service determines, based at least in part on the event, a point in time for which context information is desired. The event processing service requests the desired context information from the context management service. The context management service produces a context snapshot that describes the state of the computer system at the determined point in time, and provides the context snapshot to the event processing service. The event processing service is able to use the context information to process the event in accordance with the state of the computer system at the determined point in time.

20 Claims, 12 Drawing Sheets

EVENT CONTEXT SERVICE

BACKGROUND

Monitoring and managing the operation of a computer system is an important and difficult problem. During operation of a computer system of any substantial size, large numbers of events may occur which are processed by the computer system. Events may originate within the computer system or asynchronously outside the computer system. Since computer systems have a finite processing capacity, the processing and handling of an event by the computer system may be delayed relative to the time at which the event occurred. The state of the computer system may change over time, and therefore the computer system context in which an event is processed may be different from the computer system context in which the event occurred.

BRIEF DESCRIPTION OF THE DRAWINGS

Various techniques will be described with reference to the drawings, in which.

DETAILED DESCRIPTION

Figure 1:
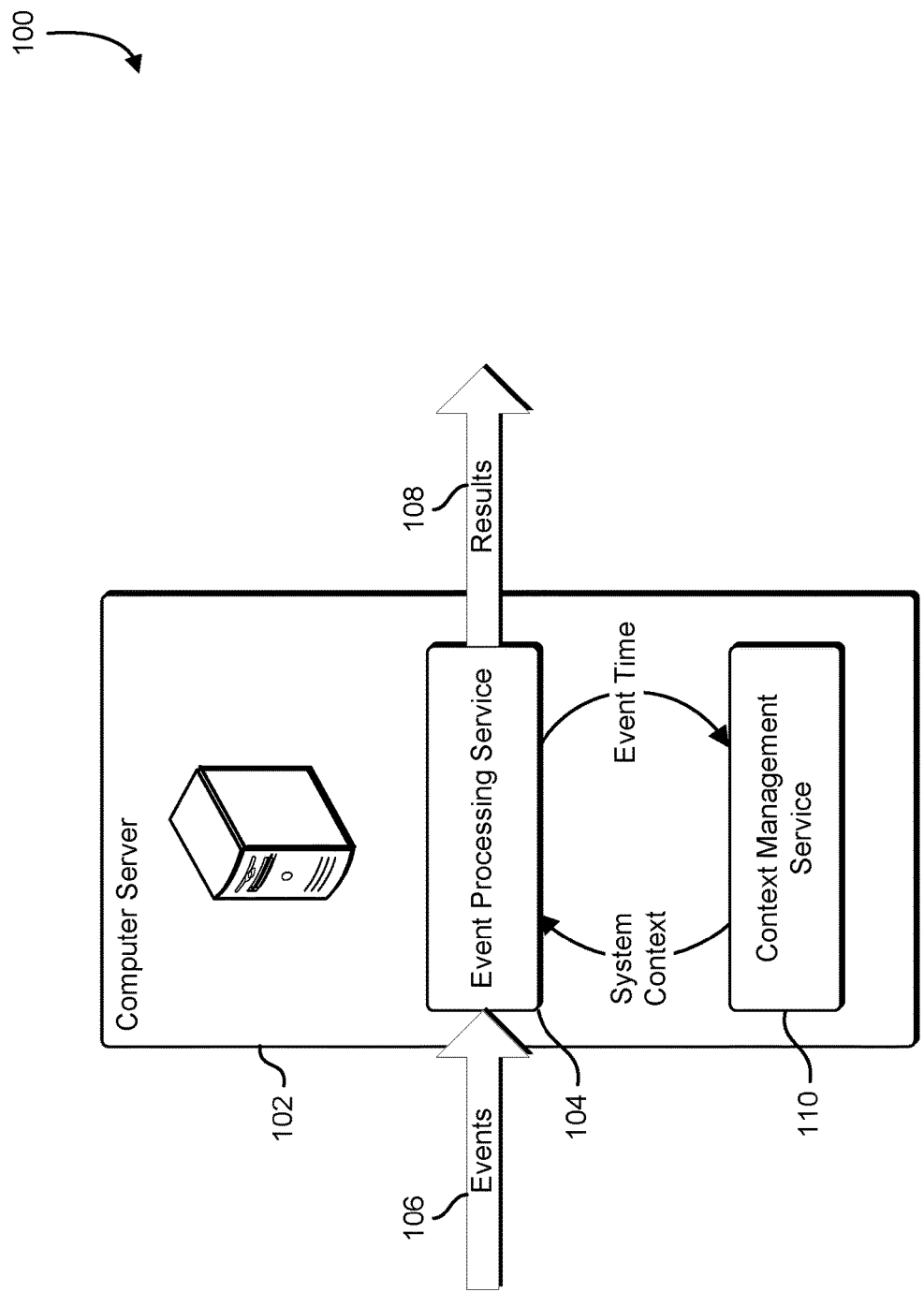
FIG. 1 shows an illustrative example of an environment in which various embodiments may be practiced.

The present document describes a computer system where a context management service provides context information describing the state of the computer system to an event processing service hosted on the computer system. The context management service monitors the state of the computer system and records in a system context database, information that describes the state of the computer system over time. When an event is received by the event processing service, the event processing service calls upon the context management service to provide context information that is relevant to the processing of the event.

The context information may include a wide array of information relating to the state of the computer system. In some examples, the context information includes information describing the computing resources installed in the computer system such as memory, disk storage, and processing resources. In another example, the context information includes information describing the computing resources available to the computer system such as an amount of free memory, free disk storage, and currently idle processing resources. In yet another example, the context information includes information describing the configuration of the computer system such as user authorization and user authentication databases, software versions, and software configuration parameters. In yet another example, the context information includes information describing external resource availability such as network status, remote service provider status, and peripheral status. The context information is stored in a system context database so that a historical timeline may be constructed showing the system context at various times in the past.

In various examples, the system context database may be maintained as a sequence of system context records that provide a complete image of the system context at a particular point in time and a number of system context change records that describe changes to the system context at particular points in time. To determine a system context at a particular point in time, the context management service identifies a system context record close to the particular point in time and applies a number of system context change records to produce a system context snapshot representing the system context at the particular point in time. In some implementations, the system context record is the system context record closest to the particular point in time that is not later than the particular point in time. In some implementations, the system context record is the first system context record after the particular point in time. In some implementations, the system context record is the system context record that has the fewest number of change records between the particular point in time and the time associated with the system context record.

As part of processing an event, the event processing service determines a time for which an associated system context snapshot is to be generated. In some examples, the time is a time at which the event occurred. In another example, the time is a time at which the event was recorded by the computer system. In yet another example, the time is a time at which the event was presented to the event processing service for processing. In yet another example, the time is the current time. In yet another example, the time is an estimated range of time during which the event may have been generated. If the time is a range of time, the range of system context snapshots may be produced by the context management service. The event processing service requests system context from the context management service by supplying the time for which context is requested. The context management service provides the context information to the event processing service, and the event processing service processes the event accordingly.

In one example, a computer system produces a historical record of system operation in the form of an event log. One or more times are recorded for each event in the event log. The times may include an event occurrence time, an event recording time and an event processing time. The events are passed to an event processing service which examines the one or more times and, based at least in part on properties of the event, selects one of the one or more times to be provided to a context management service. The context management service returns a system context snapshot to the event processing service. The system context snapshot includes information describing the state of the computer system at the specified point in time. The event processing service processes the event in accordance with the information provided in the system context snapshot.

By providing system context information to the event processing service, event processing may be improved by allowing the computer system to delay event processing or even change the order in which events are processed while still maintaining consistent results. For example, a storage service may generate a sequence of events that are placed in a queue and processed as processing resources become available. Changes in system context such as software versions or access control lists ("ACLs") may cause changes in the results produced by processing an event. By providing, to the event processing service, system context information associated with the time the event has occurred, the event processing service may be able to process an event at a later time and produce results consistent with having processed the event at the time the event occurred.

FIG. 1 shows an illustrative example of an environment in which various embodiments may be practiced. A diagram 100 shows a computer server 102 that hosts an event processing service 104. In various examples, the event processing service is a service that receives and processes an event stream such as an online storage service, a merchant platform service, a cloud computing service, a Web server, or other service. The event processing service receives an incoming stream of events 106. The incoming stream of events 106 may include events of various types based at least in part on the nature of the event processing service 104. In various examples, the incoming stream of events 106 may include user logon events, a transaction request event, a security alert event, a data acquisition event, a web request, a data retrieval request, a program execution request, or a notification event. Events may originate from one source or many sources. Events may originate from within the environment of the computer server 102, and events may originate from outside the computer server 102.

In some examples, the computer server 102 provides an event buffer that holds pending events in memory prior to being processed by the event processing service 104. In some implementations, the event buffer may be a first-in-first-out queue. In additional implementations, the event buffer may be a stack or first-in-last-out queue. In additional implementations, an event buffer may be implemented as a priority queue. As the event stream 106 is processed by the event processing service 104, the event processing service 104 produces a corresponding result stream 108. As a result of event queuing performed by the computer server 102, individual result elements in the corresponding result stream 108 may be produced in an order different from the order in which the event stream 106 is presented to the computer server 102. A given event may produce one, more than one, or no corresponding results.

As each event is processed by the event processing service 104, the event processing service may request system context from a context management service 110. The context management service 110 acquires information describing the state of the computer server 102, the environment around the computer server 102, and other general contextual information, that is provided to the event processing service 104 on request. In various examples, the system context may include context elements such as a time, a physical location, an amount of computing resources installed on the computer server 102, an amount of resources available to the computer server 102, the status of various network connections and network services, the status of various online services, system configuration information, and access control information. In some implementations, the event processing service 104 and the context management service 110 are hosted by different computer systems.

The event processing service 104 requests context information by specifying a specific time or a particular time span for which system context information is requested. The specific time or time span may be based at least in part on the timing of the event to be processed. For example, a particular event may include information that specifies a particular time at which the event occurred. The computer server 102 may record a particular time when the event is received by the computer server 102. The event processing service 104 may record a particular time when the event is retrieved from an event queue to be processed by the event processing service 104. Any of the above times or the present time may be specified by the event processing service 104 when requesting system context from the context management service 110.

The context management service 110 queries a system context database maintained by the service to generate a system context snapshot in accordance with the time specified by the event processing service 104. In some implementations, the context management service 110 maintains the system context database as a collection of system context records where each record represents a state of the computer server 102 at a particular time. In another implementation, the context management service 110 maintains the system context database as a number of system context records where each context record includes a number of associated context change records, and the context change records can be used to generate additional system context snapshots from an associated system context record. After synthesizing a system context snapshot in accordance with the time specified by the event processing service 104, the context management service 110 provides the system context snapshot to the event processing service 104.

After receiving the system context snapshot, the event processing service 104 is able to process the event in accordance with the information contained in the system context snapshot. This may, in some implementations, allow the event processing service 104 to process the incoming event stream 106 in a manner consistent with the state of the computer server 102 at the specified time. In some implementations, this may allow the event processing service 104 to process the events in the event stream 106 out of order, thereby allowing events to be rearranged for efficient processing.

Figure 2:
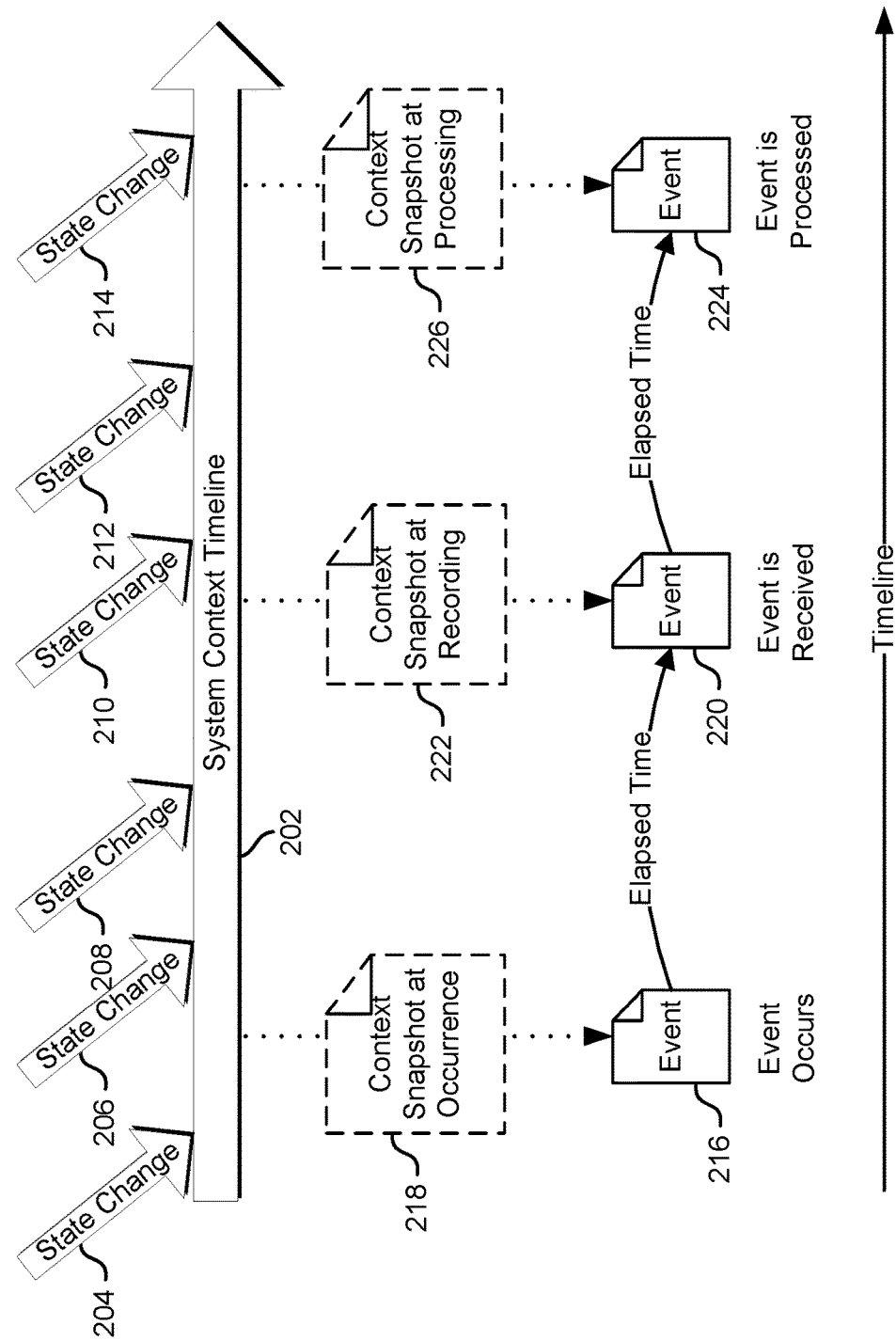
FIG. 2 shows an illustrative example of a diagram showing the operation of a system context service that provides various system context snapshots that are relevant to an event.

FIG. 2 shows an illustrative example of a diagram showing the operation of a system context service that provides various system context snapshots that are relevant to an event. A diagram 200 illustrates the interaction of a context management service and an event processing service. The context management service maintains a historical record describing a system context timeline 202. When a context management service is initialized, the context management service acquires an initial system context which is stored in a system context database. Over time a number of state changes occur within the computer system during operation. In the example shown in FIG. 2, a first state change 204, a second state change 206, third state change 208, a fourth state change 210, a fifth state change 212, and a sixth state change 214 are detected by the state management service.

When a state change is detected by the state management service, the state management service records information that allows a historical record of the system context to be recreated. In some implementations, the state management service acquires a new system context record that describes the state of the computer system in association with a time at which the state change occurred. In another implementation, the state management service acquires system context by recording a context change record describing the change relative to an existing system context record in association with a time at which the state change occurred. In yet another implementation, the state management service records a context change record describing the change relative to the current recorded context of the computer system in association with a time at which the state change occurred. Regardless of the form in which the system context information is retained by the context management service, the context management service is able to use the stored information to determine a system context for a particular point in time.

When the event processing service receives an event processing, the event processing service processes the event in accordance with a system context that is associated with a particular time. For example, the system context may include the state of the access control lists in the computer system, and the event may be processed in accordance with the state of the access control lists at the time the event occurred rather than the time at which the event is being processed. In some implementations, as the event is created and travels to the computer system to the event processing service, the computer system adds timestamps to a corresponding event record. The timestamps may be used to identify particular times at which system context is particularly relevant.

When an event occurs 216, an event record 218 is created and an event occurrence time is recorded in the event record. When the event is processed, the event processing service is able to use the recorded event occurrence time to request a system context associated with the event occurrence time. When an event is received by the computer system, an event reception time is recorded in the event record 220. When the event is processed, the event processing service is able to use the recorded event reception time to request a system context associated with the event reception time 222. When the event is processed, an event processing time is captured and stored in the event record 224. The event processing service is able to use the recorded event processing time to request system context associated with the time at which event processing begins 226. Other relevant times may be captured by the computer system and recorded in the event record such as a time that processing is complete or a timespan during which the event may have occurred.

Figure 3:
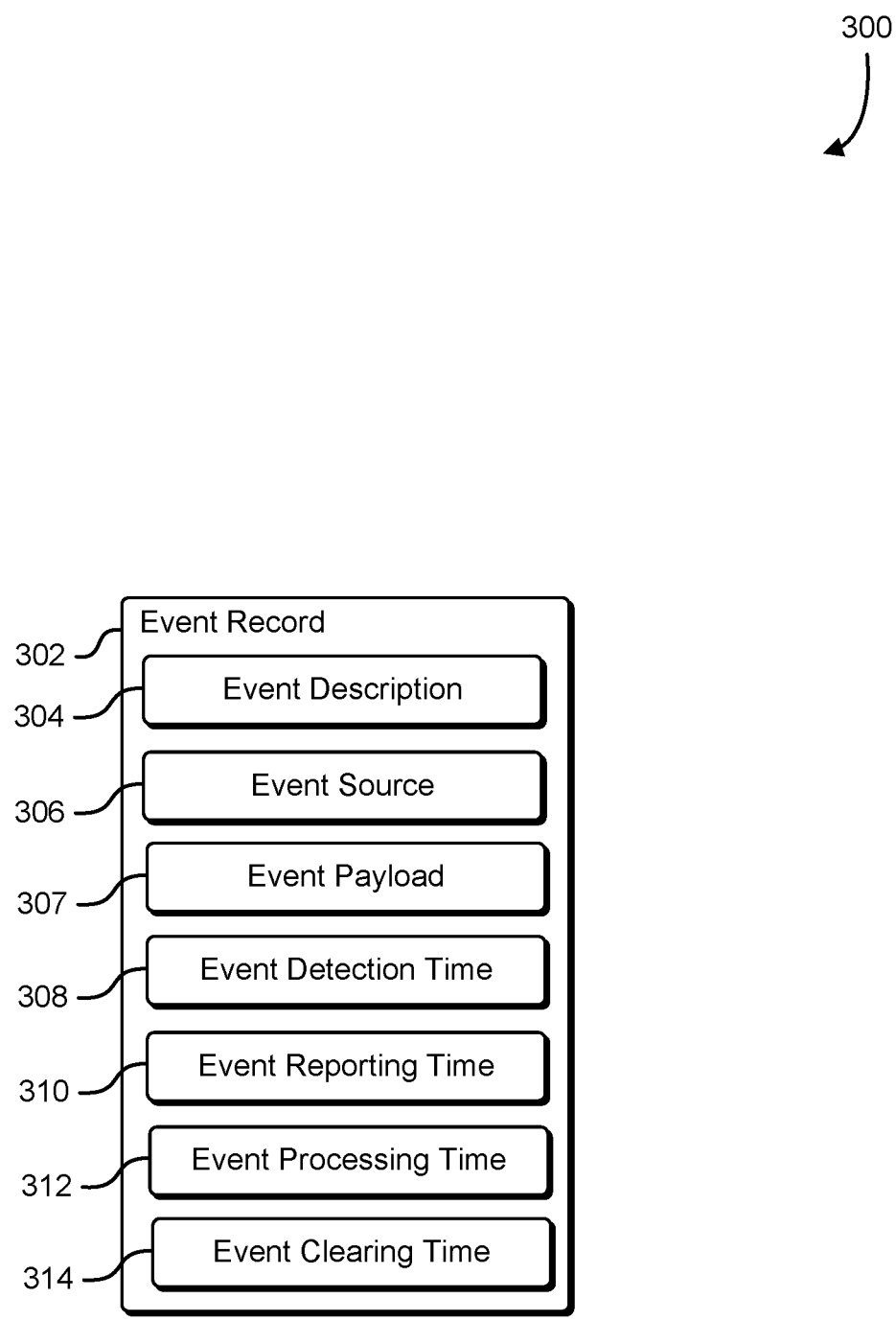
FIG. 3 shows an illustrative example of a data structure that may be used to hold an event record.

FIG. 3 shows an illustrative example of a data structure that may be used to hold an event record. A data diagram 300 shows a structure that may be used to store an event record 302. The event record may be stored with other event records in an event queue, stack, priority queue, list, database, or other structure. The event record 302 includes an event description 304 and an event source 306. In various implementations, the event description includes a string that describes the event or description identifier associated with the type of the event. The event source 306 identifies the originating entity that produced the event. The originating entity may be a service within the computer system, another computer system, or a service running on another computer system. The event source 306 may include a service name, a process ID, a host name, and a network address. The event record 302 may include an event payload 307. The event payload 307 includes data, parameters, and intermediate results associated with the event. In some examples, the event payload 307 is determined from the type of event represented by the event record 302.

The event record 302 retains a number of particular times that are relevant to the event represented by the event record 302. In the example shown in FIG. 3, the event record 302 includes an event detection time 308, an event reporting time 310, an event processing time 312, and an event clearing time 314. The event detection time 308 is a time associated with the occurrence of the event. In some implementations, the event detection time 308 is the first time that the event was detected by the computer system. In another implementation, the event detection time 308 is a timespan representing a bounded period of time in which the event occurred. For example, an aspect of system context may be acquired by polling periodically, and a change in the aspect may have occurred at any time between polling operations. The event reporting time 310 is a time at which the event record 302 was presented to the computer system for processing. The event record 302 may be subsequently processed or, in some implementations, the event record 302 is placed in an event queue for processing at a later time. The event reporting time 310 may be stored in the event record 302 by the computer system or by a service that manages the event queue. The event processing time 312 holds the time at which the event processing service begins processing the event record 302. The event processing time 312 may be stored in the event record 302 by a service that manages the event queue or by the event processing service itself.

In some examples, the event record 302 may be processed more than once. In such examples, the event processing service records the event clearing time 314 after the event record 302 is initially processed. If the event record 302 is processed more than once, the event record 302 may include a list of event processing times and a list of event clearing times.

Figure 4:
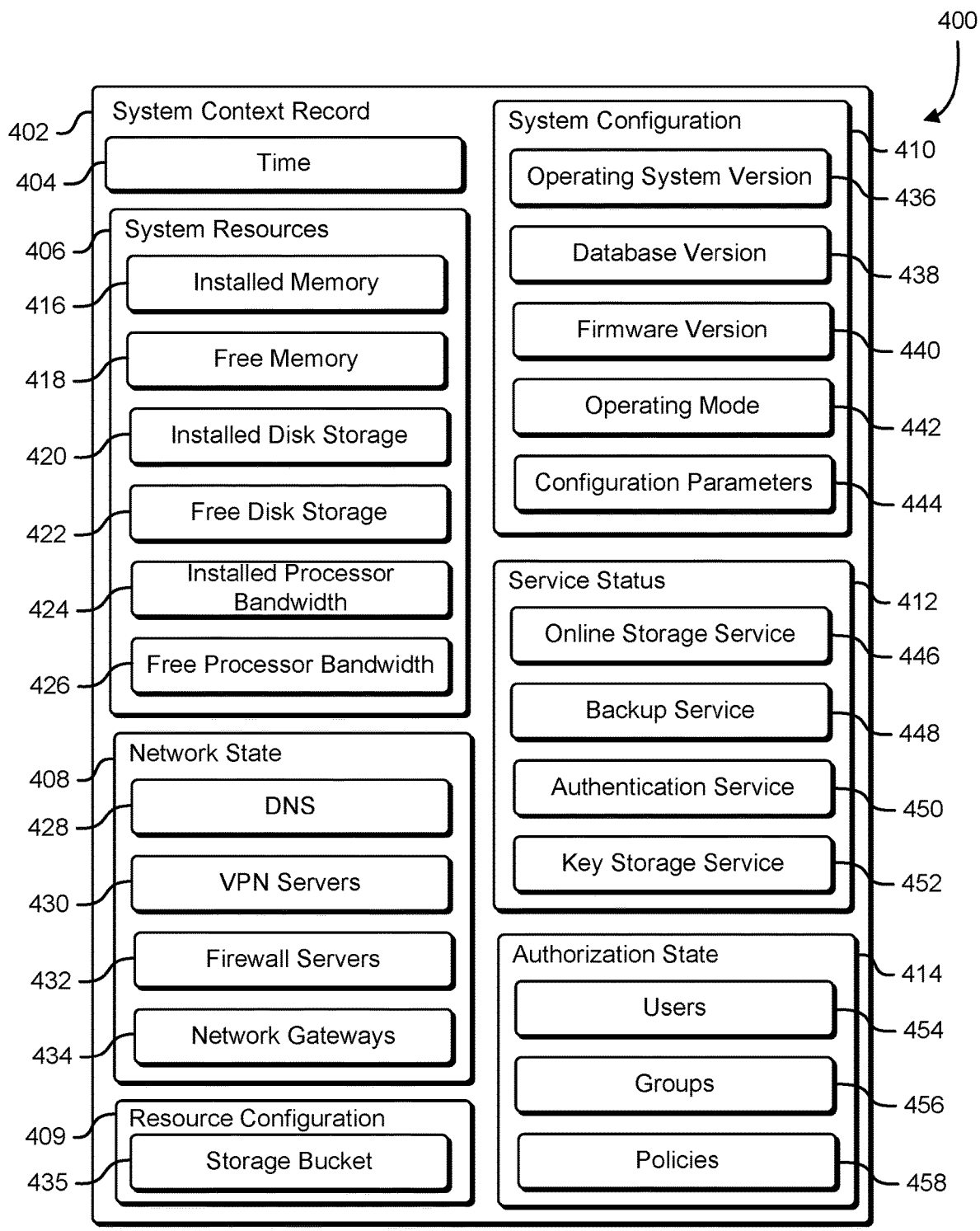
FIG. 4 shows an illustrative example of a data structure that may be used to hold a system context record.

FIG. 4 shows an illustrative example of a data structure that may be used to hold a system context record. A data diagram 400 illustrates a structure of a system context record 402. A context management service maintains a plurality of system context records that maintain a record of system context over time. The system context record 402 includes a time field 404 that records the point in time at which the information in the system context record 402 was collected. In addition to the time field 404, the system context record 402 holds context information in a number of context groups, each of which contains one or more pieces of related context information. The system context record 402 includes a system resources group 406, a network state group 408, a resource configuration group 409, a system configuration group 410, a service status group 412, and an authorization state group 414.

The system resources group 406 includes an installed memory field 416, a free memory field 418, an installed disk storage field 420, a free disk storage field 422, an installed processor bandwidth field 424, and a free processor bandwidth field 426. The installed memory field 416 holds a value that represents the amount of memory installed in the computer system. In some examples, the amount of memory installed in the computer system is an amount of random-access memory, in bytes. The free memory field 418 holds a value that describes an amount of memory that is available for use in the computer system. In some examples, the amount of memory that is available for use is determined by subtracting the amount of memory allocated to active processes and services from an amount of memory installed on the computer system. The installed disk storage field 420 holds a value that describes the amount of installed nonvolatile storage space on the computer system. In some examples, the amount of installed nonvolatile storage space includes storage space that is connected via a peripheral connection or network connection. The free disk storage field 422 holds a value that describes the amount of unused nonvolatile storage space on a computer system. In some implementations, the amount of unused nonvolatile storage space in the computer system is determined by subtracting the amount of nonvolatile storage allocated to file systems, swap space, and paging space from the total amount of installed nonvolatile storage space available to the computer system. The installed processor bandwidth field 424 describes the total amount of processing capacity available to the computer system. The total amount of processing capacity available to the computer system may be described in operations per second, a number of processors, or a maximum number of simultaneous threads that may be executed concurrently. The free processor bandwidth field 426 describes the amount of processing bandwidth that was not in use at the time indicated by the time field 404.

The network state group 408 includes a domain name server ("DNS") field 428, a virtual private network ("VPN") servers field 430, a firewall servers field 432, and a network gateways field 434. The DNS field 428 identifies the DNS servers currently configured for use by the computer system as well as the operational state of each of the DNS servers that are currently configured for use. The VPN servers field 430 identifies the VPN servers that are currently configured and also identifies the operational state of each VPN server. The firewall servers field 432 identifies any firewall servers that are currently used to isolate the computer system from external networks and also records the operational state of each firewall server. The network gateways field 434 identifies the network gateways and proxies used by the computer system, as well as the operational state of each gateway or proxy.

The resource configuration group 409 may include context-information fields that describe the configuration and state of external resources such as storage resources, peripherals, or online services. In one example, the resource configuration group 409 includes a storage bucket field 435. The storage bucket field 435 describes the state of an online storage service used by the system.

The system configuration group 410 includes an operating system version field 436, a database version field 438, a firmware version field 440, an operating mode field 442, and a configuration parameters field 444. The operating system version field 436 identifies software versions applicable to the software running on the computer system at the time indicated by the time field 404. In various examples, the operating system version field 436 may include an operating system version, a middleware version, a browser version, a flash version, or a Java runtime version. The database version field 438 includes information that describes a database schema version or database runtime version. For example, if a database schema changes over time, each version is associated with an identifier, and the schema identifier in use at the time identified in the time field 404 may be stored in the database version field 438. The firmware version field 440 may include a boot firmware version of the computer system, or firmware versions associated with various peripherals installed in the computer system. The operating mode field 442 describes the operating mode of the computer system at the time identified in the time field 404. In various implementations, the operating mode describes the mode of operation as initializing, running, shutting down, sleeping, or hibernating. The configuration parameters field 444 describes the configuration of the computer system at the time indicated by the time field 404. The configuration parameters may include command line parameters issued to the event processing service, system parameters configured by an administrator, or user settings configured by an end-user.

The service status group 412 includes an online storage service field 446, a backup service field 448, an authentication service field 450, and a key storage service field 452. The online storage service field 446 is used to store the status of an online storage service used by the computer system. The status of the online storage service may include an amount of available storage, an amount of upload and download bandwidth, and whether or not the storage service is online or off-line. The backup service field 448 records the status of a data backup service. The backup service may be a local service that stores information to a local storage device or a remote service that backs up information to a remote storage location. The status of the backup service may indicate whether the backup service is available or down and whether the current backup image is up-to-date or currently updating. The authentication service field 450 describes whether authentication services are properly functioning and available. The authentication services may be a service running on the computer system or a separate login service running on a remote login server. The key storage service field 452 contains information that describes the status of the key storage service. The key storage service is a service that manages cryptographic keys that are used by the computer system.

The authorization state group 414 includes the users field 454, the groups field 456, and the policies field 458. The users field 454 identifies the users that are registered to use the computer system. The groups field 456 describes groups of users that are organized into manageable units. The policies field 458 describes the access policies that are applicable to the various users and groups described in the users field 454 and the groups field 456. In some implementations, the information contained in the authorization state group 414 may include a digital signature applied by the computer system to protect the integrity of the information. In one implementation, the computer system updates the information in the authorization state group 414, generates a digital signature of the information in the authorization state group 414 using a cryptographic key that is under the control of the computer system, and records the digital signature in the authorization state group 414. In one implementation, the digital signature is a hashed message authentication code ("HMAC") of the information in the authorization state group 414 and the time specified in the time field 404.

Figure 5:
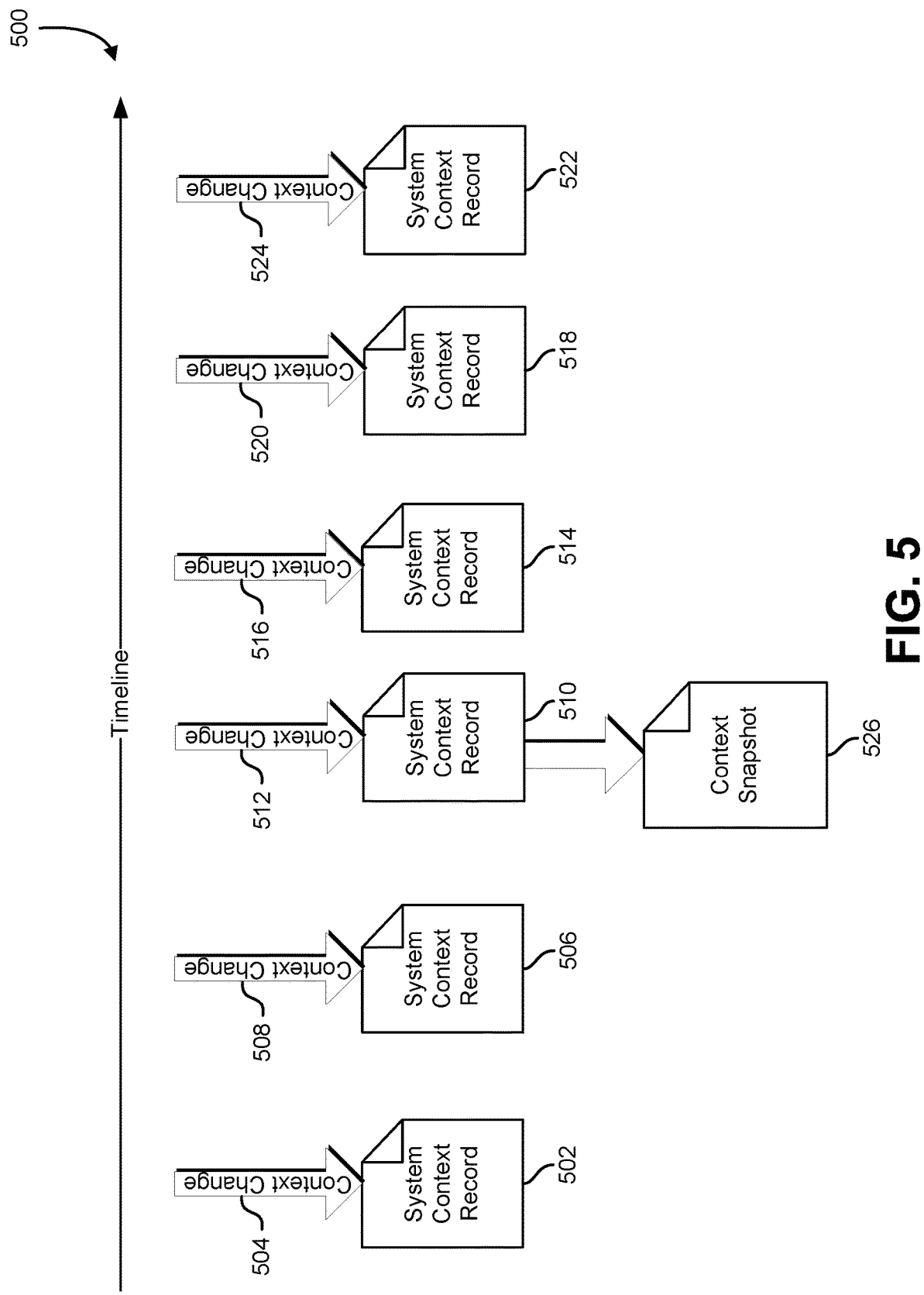
FIG. 5 shows an illustrative example of a system context database that generates and records a plurality of system context records in response to a plurality of changes in system context.

FIG. 5 shows an illustrative example of a system context database that generates and records a plurality of system context records in response to a plurality of changes in system context. A diagram 500 illustrates the generation and management of a system context database by a context management service. In one example, a context management service monitors the state of a computer system. When a change to the state of the computer system is detected, a context change is indicated. The context management service interrogates the computer system and assembles a corresponding system context record. In the example shown in FIG. 5, the context management service generates first system context record 502 in response to a first context change 504. The context management service generates a second system context record 506 in response to a second context change 508. The context management service generates a third system context record 510 in response to a third context change 512. The context management service generates a fourth system context record 514 in response to a fourth context change 516. The context management service generates a fifth system context record 518 in response to a fifth context change 520. The context management service generates a sixth system context record 522 in response to a sixth context change 524. Each system context record includes a time that records when the associated context change was indicated.

When an event processing service receives an event for processing, the event processing service identifies a context time based on the event. The event processing service requests, from the context management service, a system context snapshot for the context time. The context management service searches the collection of system context records and identifies the most recent system context record that is not newer than the context time indicated by the event processing service. The context management service then generates a context snapshot 526 from the identified system context record. For example, if the context time indicated by the event processing service is greater than or equal to the time at which the third context change 512 occurred and before the fourth context change 516 occurred, the context management service identifies the third system context record 510 as having the applicable state information. The context management service generates the context snapshot 526 based at least in part on information in the third system context record 510 and provides the resulting context snapshot 526 to the event processing service.

Figure 6:
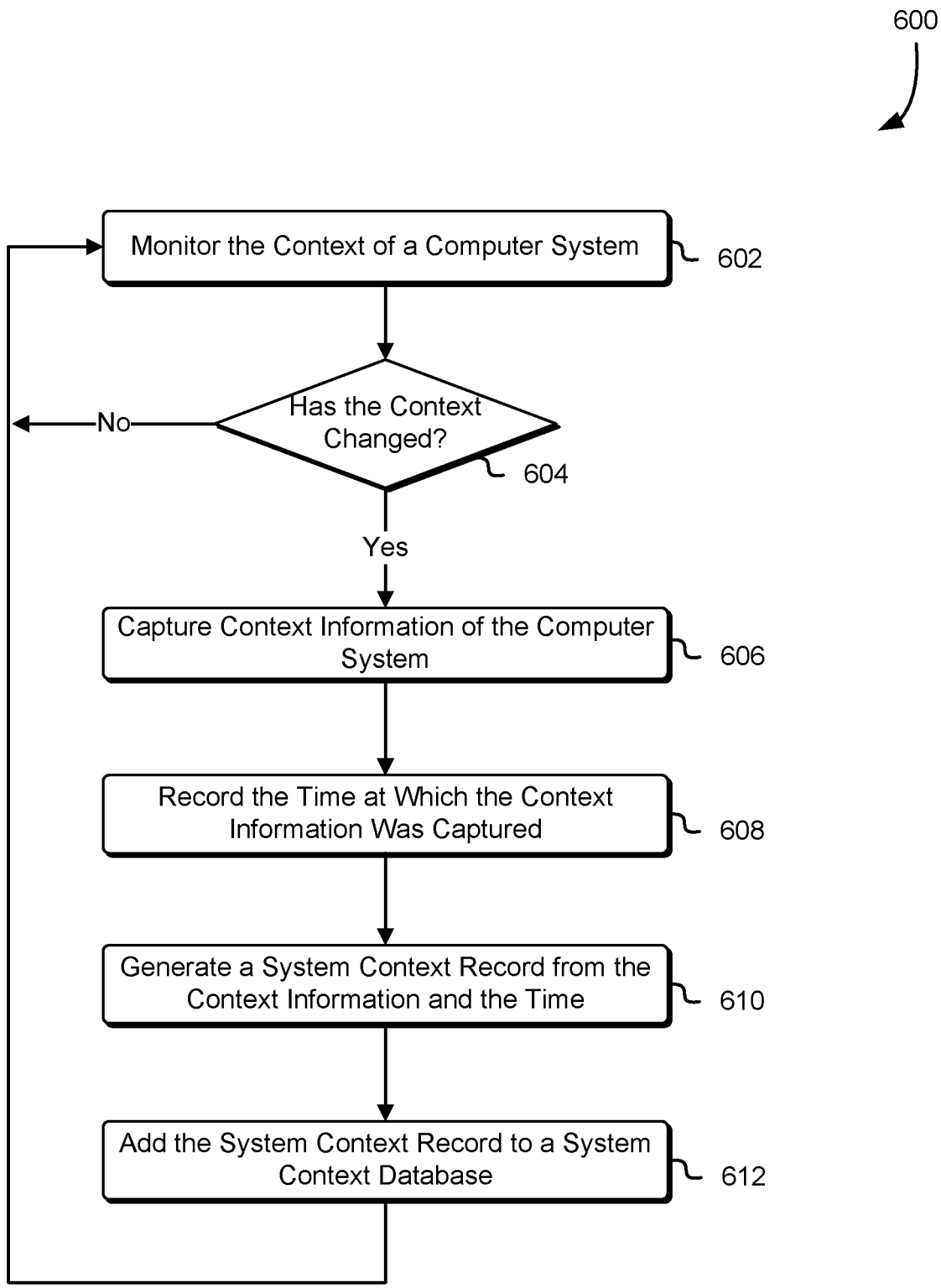
FIG. 6 shows an illustrative example of a process that, as a result of being performed by a context management service, generates and stores a system context record in response to detecting a change in system context.

FIG. 6 shows an illustrative example of a process that, as a result of being performed by a context management service, generates and stores a system context record in response to detecting a change in system context. A flowchart 600 illustrates a process that begins at block 602 with a context management service monitoring the context of the computer system. In general, the context of the computer system describes the state of the computer system. The context may include quantities such as computing resources available to the computer system, access control lists, configuration settings, and software versions. In some implementations, the context management service receives notifications from a subsystem, service, or agent associated with the computer system. The notifications provide to the context management service an indication that a particular aspect of the system context has changed. In another implementation, the context management service periodically retrieves status information relating to an aspect of the computer system context. The context management service is able to determine, as a result of consecutive status retrievals, whether the aspect of the computer system context has changed.

At decision block 604, the context management service determines whether an aspect of the system context has changed. If the aspect of the system context has not changed, execution returns to block 602 and the context management service continues monitoring the context of the computer system. If the aspect of the system context has changed, execution advances to block 606 and the context management service acquires context information associated with the computer system. At block 608, the context management service records a time at which the context information was captured. In some implementations, the context management service records a time at which each aspect of the context information is captured. At block 610, the context management service generates a system context record and stores the context information and the time at which the context information was captured in the system context record. The system context record is added 612 to a system context database maintained by the context management service. In some examples, the system context database is a list of system context records. In another example the system context database is an ordered array of system context records sorted by the time at which the context information was captured. After storing the system context record, execution returns to block 602 and the context management service returns to monitoring the context of the computer system.

Figure 7:
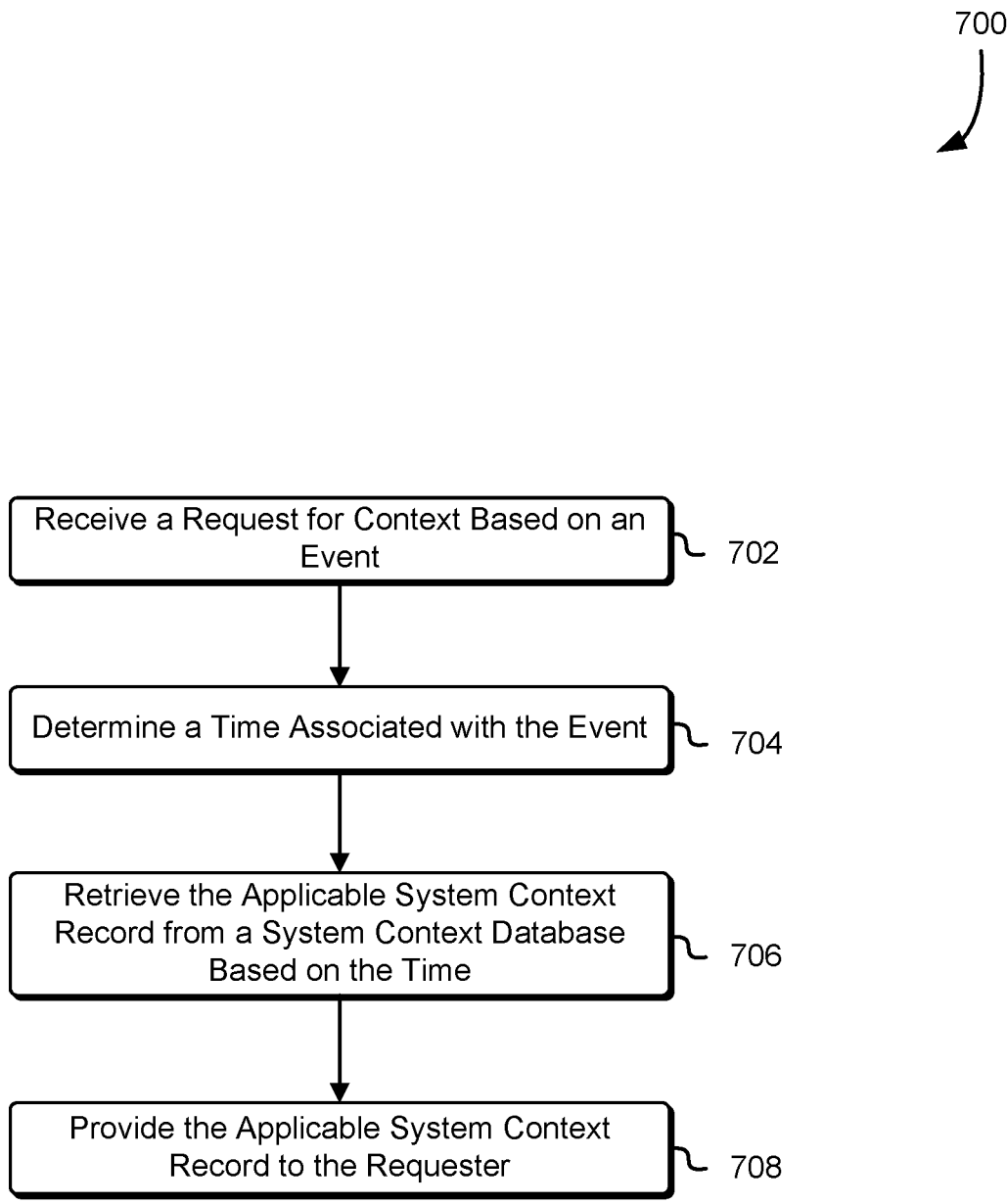
FIG. 7 shows an illustrative example of a process that, as a result of being performed by a context management service, provides system context to an event processor.

FIG. 7 shows an illustrative example of a process that, as a result of being performed by a context management service, provides system context to an event processor. A flowchart 700 illustrates a process that begins at block 702 with a context management service receiving a request for context. In some examples, the request for context includes a time for which the system context is to be retrieved. In another example, the request for context includes an event, and the event includes one or more identified times for which system context is to be retrieved. At block 704, the context management service determines a time for which system context is to be determined. In some implementations, the time is specified within the request for context. In another implementation, the time is determined based on the event identified in the request. If an event is identified in the request for context, the time may be a time at which the event occurred, a time at which the event was received by the computer system, or a time at which the requester started processing the event.

At block 706, the context management service retrieves an applicable system context record from a system context database. In some examples, the context management service searches the system context database and locates the most recent system context record that is no later than the time determined at block 704. In another example, each system context record in the system context database is associated with a timespan, and the context management service searches the system context database and locates a system context record associated with the time determined at block 704. At block 708, the context management service provides the applicable system context record to the requester. In some examples, the requester is an event processing service.

In some examples, an event specifies a number of distinct times for which system context is to be determined. In such examples, the context management service may determine an applicable system context record for each of the number of distinct times and provide the plurality of system context records to the requester.

Figure 8:
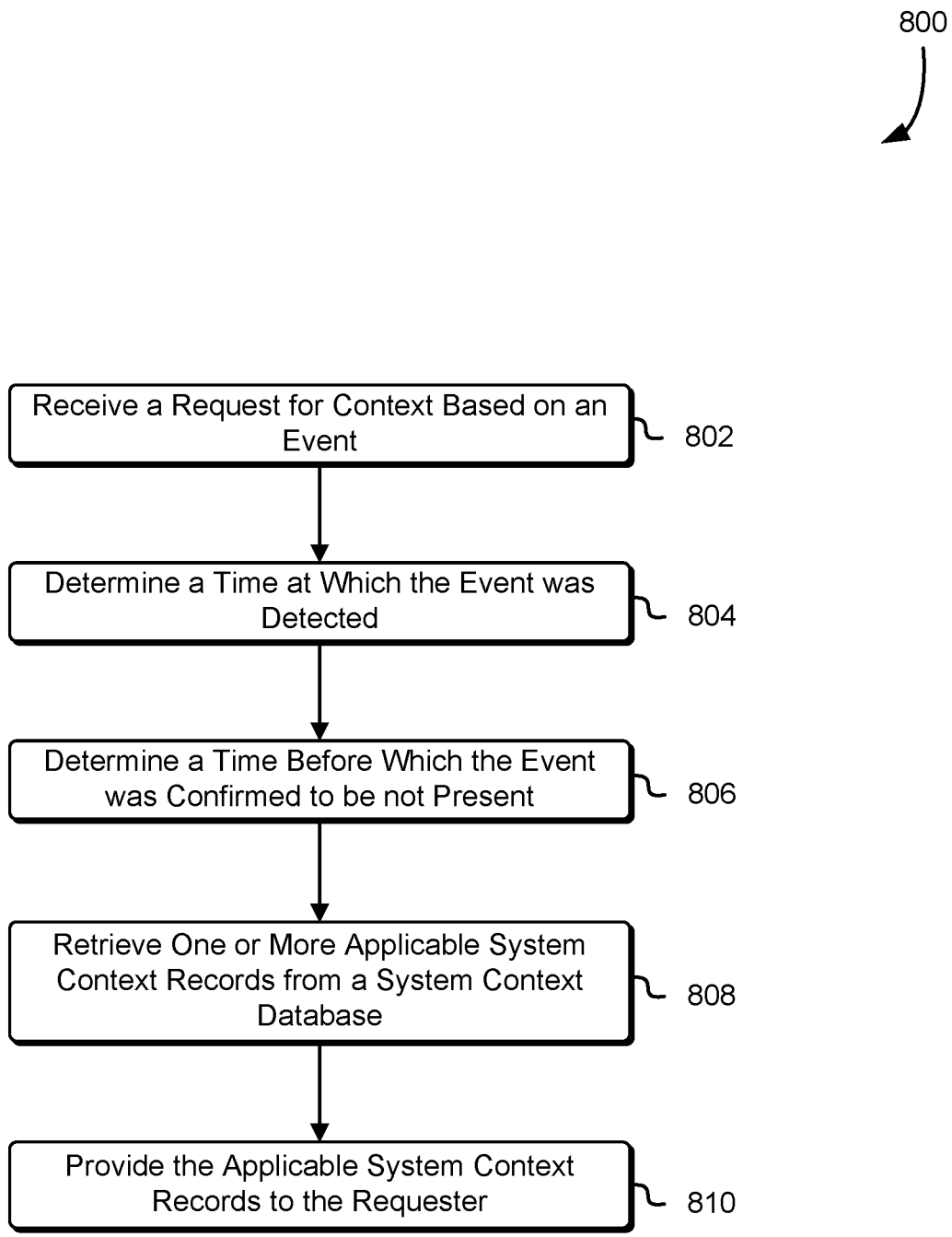
FIG. 8 shows an illustrative example of a process that, as a result of being performed by a context management service, provides a range of system contexts that are associated with the occurrence of an event.

FIG. 8 shows an illustrative example of a process that, as a result of being performed by a context management service, provides a range of system contexts that are associated with the occurrence of an event. A flowchart 800 illustrates a process that begins at block 802 with a context management service receiving a request for context. The request for context identifies an event. At block 804, the context management service uses information provided with the event to determine when the event was detected by the computer system. At block 806, the context management service uses information provided with the event to determine the earliest time that the event could have occurred. The resulting timespan is used to retrieve 808 one or more applicable system context records from a system context database. The resulting system context records are provided 810 to the requester.

The process shown in FIG. 8 may be used by the context management service to provide a range of context records that correlate to a timespan rather than a specific time. This may be particularly useful when the computer system is unable to determine an exact time at which an event occurred. The requester, often an event processing service, may select a particular context if more than one context is provided. In some examples, only one aspect of context is needed, and the provided contexts may agree on the needed aspect. In other examples, the event processing service may select a particular context based on the projected impact of each context. For example, the event processing service may select the most restrictive ACL from the sets of ACL's associated with the various contexts.

Figure 9:
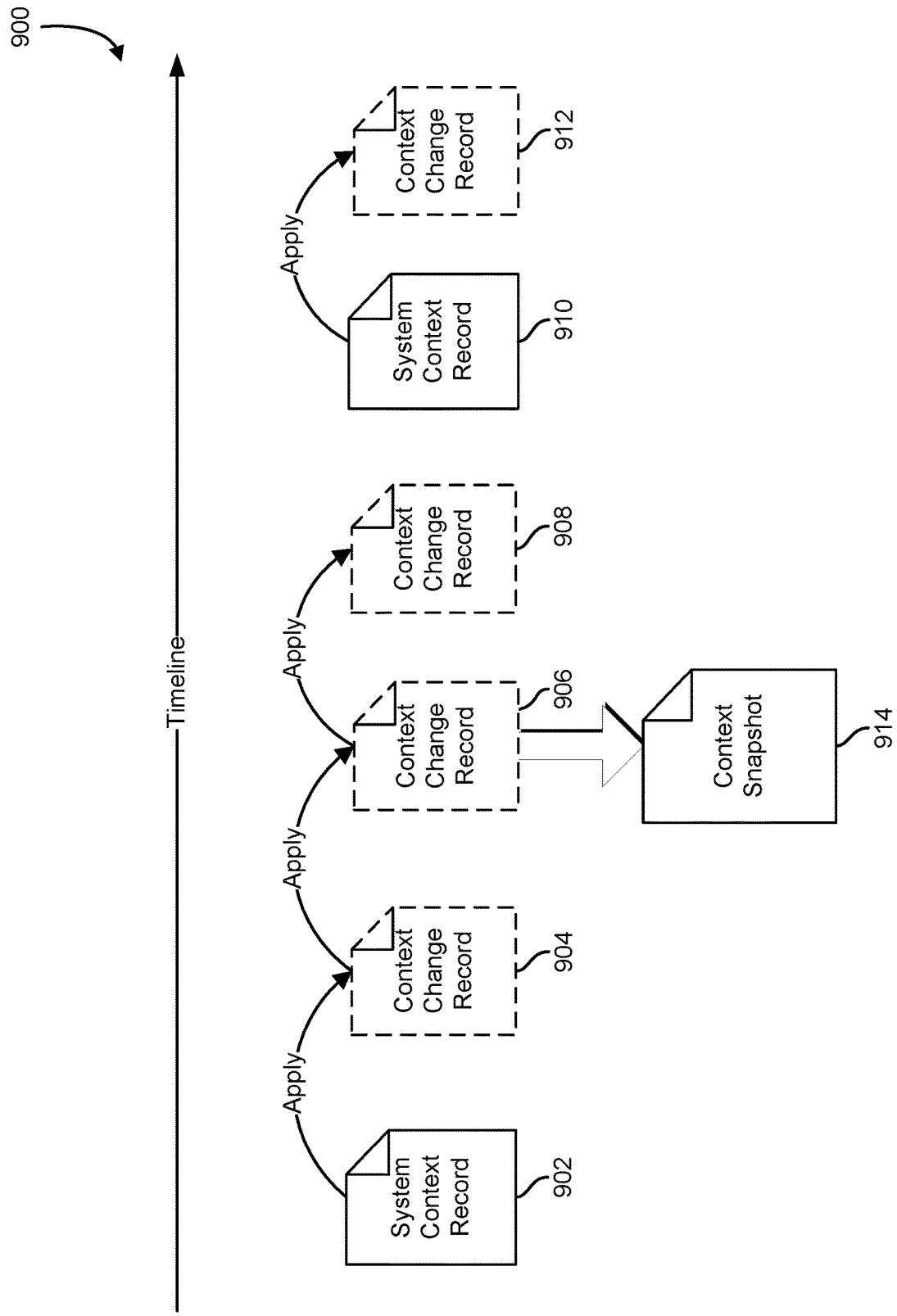
FIG. 9 shows an illustrative example of a system context database that retains a number of incremental context change records for each system context record.

FIG. 9 shows an illustrative example of a system context database that retains a number of incremental context change records for each system context record. A diagram 900 shows a system context database that includes a number of system context records and an associated set of context change records. The system context database includes a first system context record 902. The first system context record 902 is associated with a first context change record 904, a second context change record 906, and a third context change record 908. The system context database includes a second system context record 910. The second system context record 910 is associated with a fourth context change record 912. Each system context record includes a set of system context information, and identifies a time at which the system context information was collected. Each context change record includes information that describes a change to system context information, and identifies a time at which the change to system context occurred. Using the system context records and their associated context change records, a context management service is able to reproduce a context snapshot for a selected time within the range of times spanned by the context records and change records.

In an example, an event processing service requests system context for a time between the time of the second context change record 906 and the time of the third context change record 908. The context management service generates a context snapshot 914 by retrieving the first system context record 902 and then applying the first context change record 904 and the second context change record 906 to the information contained in the first system context record 902. In some implementations, the information in each context change record represents a change relative to the first system context record 902. In such implementations, the context snapshot 914 is created by applying information in the second context change record 906 to the first system context record 902.

Figure 10:
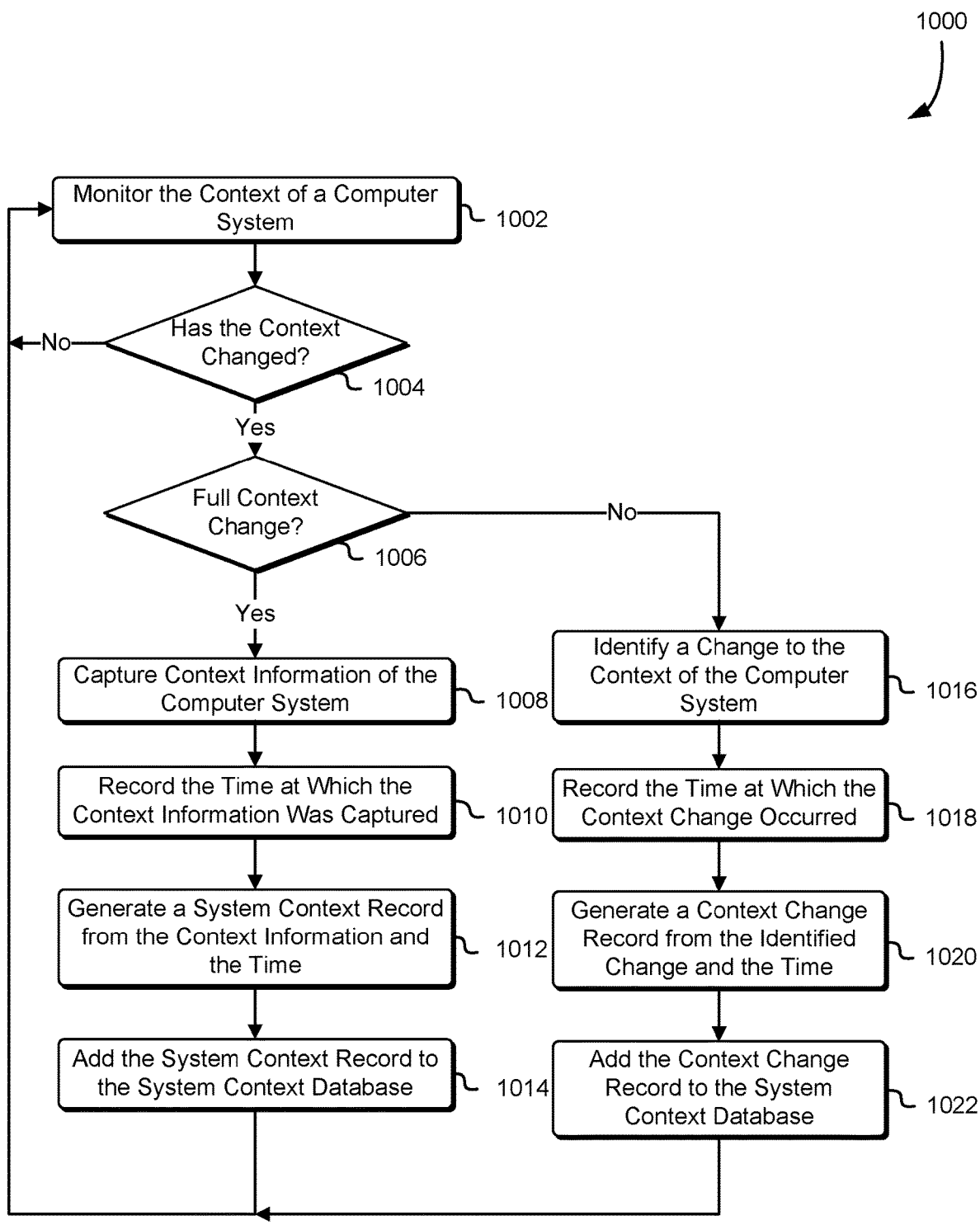
FIG. 10 shows an illustrative example of a process that, as a result of being performed by a context management service, produces a system context database that retains a number of incremental context change records for each system context record.

FIG. 10 shows an illustrative example of a process that, as a result of being performed by a context management service, produces a system context database that retains a number of incremental context change records for each system context record. A flowchart 1000 illustrates a process that begins at block 1002 with a context management service monitoring the context of a computer system. At decision block 1004, the context management service determines whether the context of the computer system has changed. If the context of the computer system has not changed, execution returns to block 1002 and the context management service continues monitoring the context of the computer system. If the context of the computer system has changed, execution proceeds to decision block 1006. At decision block 1006, the context management service determines an extent to which the context has changed and, based on the extent of the change, determines whether to generate a system context record or a context change record. In some implementations, the context management service determines to generate a new system context record as a result of having previously generated a threshold number of consecutive context change records. In another implementation, the context management service determines to generate a new system context record as a result of a threshold amount of time elapsed since the last system context record was generated. If the context management service determines to generate a system context record, execution advances to block 1008.

At block 1008, the context management service captures a set of context information associated with the computer system. At block 1010, a time at which the context information was retrieved is recorded. At block 1012, the context management service uses the captured context information and the time to generate a new system context record. The new system context record is added 1014 to a system context database maintained by the context management service. In some implementations, the context management service maintains a counter of context change records produced since the previous system context record. In such implementations, the counter of context change records is reset.

If, at decision block 1006, the context management service determines to generate a context change record, execution advances to block 1016. At block 1016, the context management service identifies one or more changes to the context of the computer system. The context management service records 1018 the time at which the context changes occurred. At block 1020, the context management service generates a context change record that includes information describing the identified changes to the system context, and the context management service adds the context change record 1022 to the system context database.

After the system context record or the context change record is added to the system context database, execution returns to block 1002 and the system context is further monitored by the context management service. The resulting system context database includes a mix of system context records and incremental context change records that maintain the ability of the context management service to recreate the system context while reducing the total amount of storage space used to retain the system context information.

Figure 11:
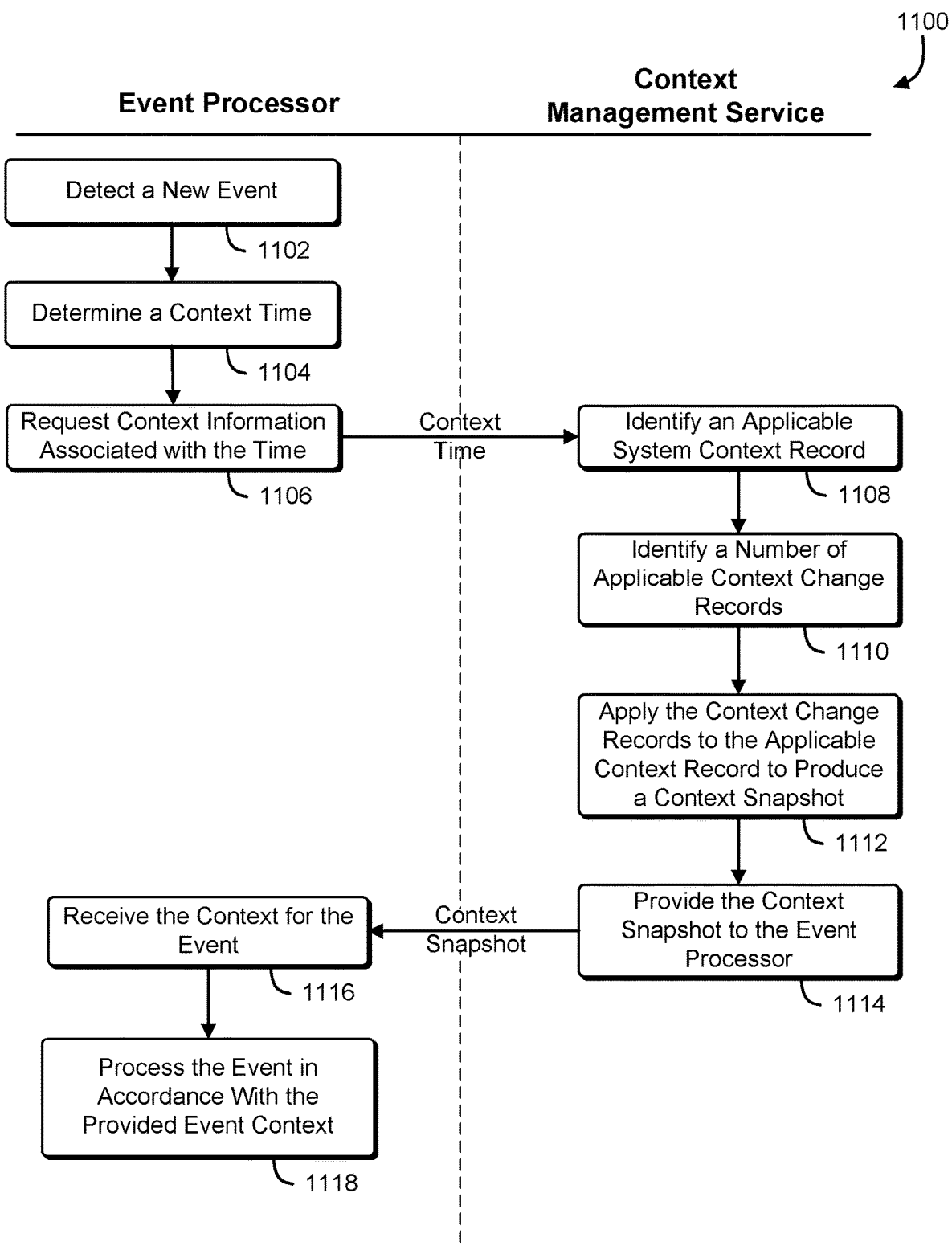
FIG. 11 shows an illustrative example of a process that, as a result of being performed by a context management service and an event processor, provides contextual information associated with an event to the event processor.

FIG. 11 shows an illustrative example of a process that, as a result of being performed by a context management service and an event processor, provides to the event processor contextual information associated with an event. A swim diagram 1100 illustrates a process that begins at block 1102 with an event processor detecting a new event. In some examples, the event is received and stored in event queue on the computer system before being presented to the event processor. At block 1104, the event processor examines the event and, based on the characteristics of the event, determines a context time for determining computer system context. In some examples, the event processor determines that the context time is the time that the event occurred. At block 1106, the event processor submits a request for context to the context management service. The request for context specifies the context time.

The context management service receives the request for context from the event processor at block 1108 and searches a system context database for an applicable system context record. At block 1110, the context management service identifies a number of context change records that are explicable to system context record and that may be used to produce the requested system context. In some examples, the applicable system context record is the most recent system context record before the requested context time. In other examples, the applicable system context record is the first system context record after the requested context time. The number of context change records may be zero or more records that, when applied to the applicable system context record, produce a system context for the requested context time. At block 1112, the context management service applies the context change records to the applicable context record to produce a context snapshot. The context snapshot represents the system context at the context time specified in the request. At block 1114, the context management service provides the generated context snapshot to the event processor.

The event processor receives the context snapshot at block 1116. At block 1118, the event processor uses the information in the context snapshot to process the event. For example, using the above process, the event processor may process the event using ACL's, system configurations and software versions that were present at the time the event was received by the computer system. This may be particularly useful in large computer systems as it may alleviate the need to process a large backlog of events prior to making changes to the system configuration.

Figure 12:
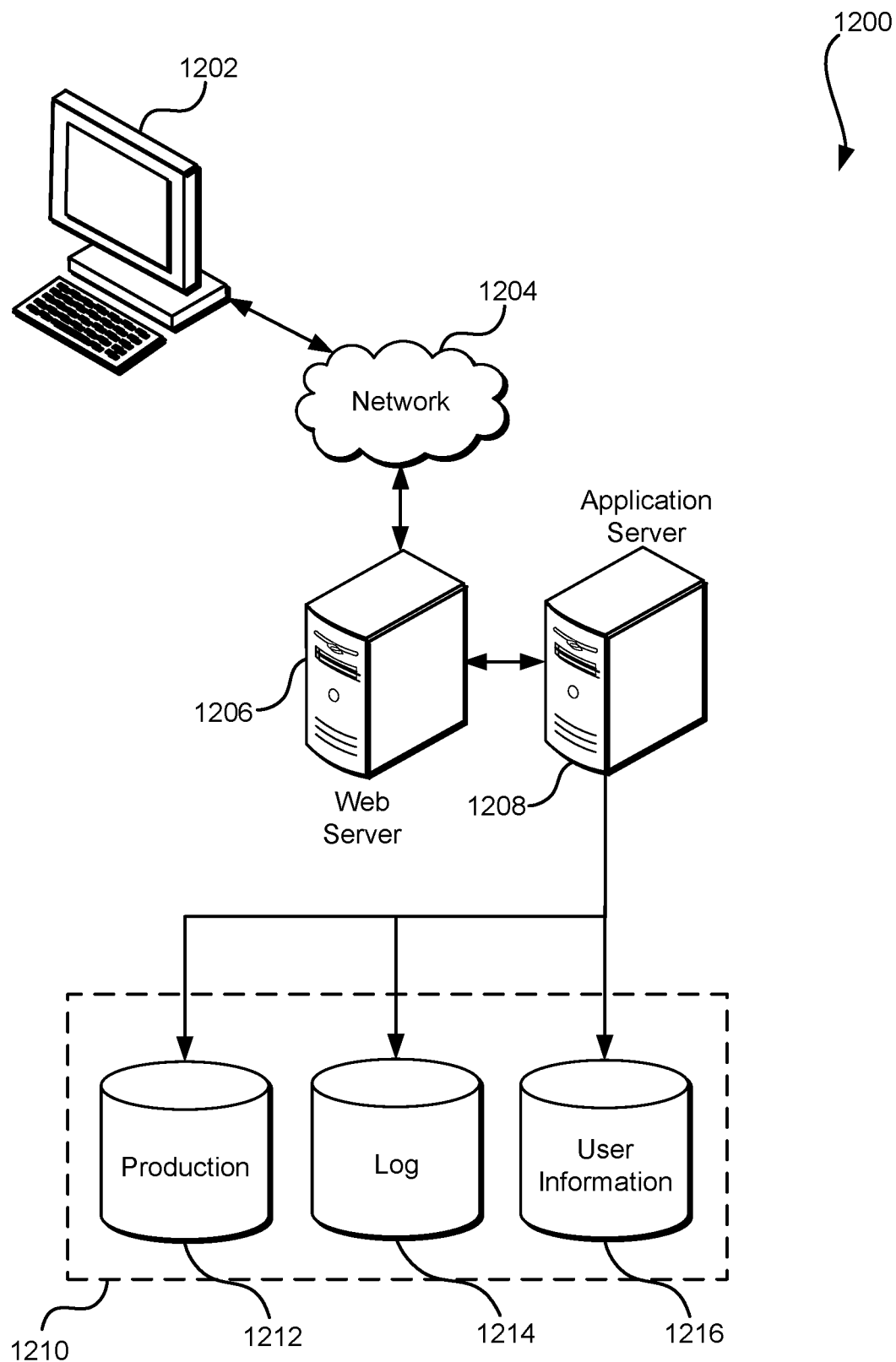
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1202 and the application server 1208, can be handled by the web server using PUP: Hypertext Preprocessor ("PUP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PUP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    acquiring system context information that is based at least in part on a state of a computer system at a point in time;
    storing the system context information in a data store in association with the point in time;
    obtaining a request for system context information from an event processing service, the request specifying a context time;
    generating a context snapshot from information stored in the data store, the context snapshot describing a state of the computer system associated with the context time;
    providing the context snapshot to the event processing service; and
    causing the event processing service to process an event in accordance with the state of the computer system associated with the context time.

2. The computer-implemented method of claim 1, wherein:
    the data store retains a plurality of system context records;
    each record in the plurality of system context records describes a state of the computer system at a particular time; and
    the system context information is retained in the data store as a change record that describes a difference between a particular system context record and a state of the computer system at the point in time.

3. The computer-implemented method of claim 1, wherein the context time is either a time at which the event occurred, a time at which the event was acquired by the event processing service, or the time at which the event was processed by the event processing service.

4. The computer-implemented method of claim 1, wherein:
    the context snapshot includes access control list information; and
    the event is processed in accordance with access control lists in force at the context time.

5. A computer system, comprising:
    one or more processors; and
    memory to store computer-executable instructions that, if executed, cause the one or more processors to:
        place an event obtained by the computer system in a queue with other events;
        retain a historical record of system context information that is based at least in part on one or more states of the computer system;
        produce a system context snapshot from the historical record of system context information based at least in part on the event, the system context snapshot representing the state of the computer system at a time when an event was obtained by the computer system and placed in the queue; and
        process the event in accordance with the system context snapshot.

6. The system of claim 5, wherein the historical record of system context information is accumulated by at least:
    capturing a state of the computer system at regular intervals; and
    storing the state of the computer system in a data store in association with a time at which the state of the computer system was captured.

7. The system of claim 5, wherein the historical record of system context information is accumulated by at least:
    determining that the state of the computer system has changed;
    as a result of determining that the state of the computer system has changed, capturing the state of the computer system; and
    storing the state of the computer system and a data store in association with a time at which the state of the computer system was captured.

8. The system of claim 5, wherein:
    the historical record is maintained as an ordered list of system context records;
    each system context record in the list of system context records is associated with a particular point in time; and
    the ordered list is ordered using the particular point in time associated with each system context record.

9. The system of claim 5, wherein:
    the computer-executable instructions further cause the one or more processors to produce an additional system context snapshot; and
    the system context snapshot and the additional system context snapshot are associated with a time span determined based at least in part on the event obtained by the computer system for processing.

10. The system of claim 5, wherein:
    the computer-executable instructions further cause the one or more processors to determine a point in time based at least in part on when the event occurred; and the system context snapshot describes the state of the computer system at the point in time.

11. The system of claim 5, wherein:

the context snapshot includes access control list information; and the event is processed in accordance with access control lists in force at a time associated with the event.

12. The system of claim 5, wherein:

the event is a command obtained by an online data storage service;

the context information includes an access control list that is applicable to the online storage service; and the event is processed by the online storage service in accordance with an access control list that is enforced the time the event was generated.

13. A non-transitory computer-readable storage medium storing thereon executable instructions that, as a result of being executed by one or more processors of a computer system, cause the computer system to at least:

identify a point in time based at least in part on information associated with an event record generated by an online service and obtained by the computer system, the event record generated as a result of a call to an application programming interface of the online service;

obtain context information that is based at least in part on a state of the computer system at the identified point in time; and process the event record in accordance with the context information.

14. The non-transitory computer-readable storage medium of claim 13, wherein:

the context information identifies a particular version of software running on the computer system; and the event record is processed using the particular version of software.

15. The non-transitory computer-readable storage medium of claim 13, wherein:

the instructions further comprise instructions that, as a result of being executed by the one or more processors, cause the computer system to store the event record in a queue at a first time;

the identified point in time is the first time; and the event record is processed using context information that describes the state of the computer system at the first time.

16. The non-transitory computer-readable storage medium of claim 13, wherein:

the instructions further comprise instructions that, as a result of being executed by the one or more processors, cause the computer system to acquire an additional context information that describes the state of the computer system at an additional point in time; and the event is processed in accordance with both the context information and the additional context information.

17. The non-transitory computer-readable storage medium of claim 16, wherein:

the point in time coincides with when the event occurred; and the additional point in time coincides with either when the event was acquired by the computer system or when the event was processed.

18. The non-transitory computer-readable storage medium of claim 13, wherein the point in time is identified based at least in part on information in the event record.

19. The non-transitory computer-readable storage medium of claim 13, wherein the point in time is when the event is obtained by the computer system.

20. The non-transitory computer-readable storage medium of claim 13, wherein:

the context information includes information that identifies a particular version of a database schema; and the event record is processed in accordance with the particular version of the database schema.

* * * * *